: US 9,488,213 B2
: Nov. 8, 2016

United States Patent
Corbett

(54) FASTENER AND FASTENER INSTALLATION TOOL

(71) Applicant: ALCOA INC., Pittsburgh, PA (US)

(72) Inventor: Robert J. Corbett, Woodway, TX (US)

(73) Assignee: Alcoa Inc., Pittsburgh, PA (US)

( * ) Notice: Subject to any disclaimer, the term of this patent is extended or adjusted under 35 U.S.C. 154(b) by 74 days.

(21) Appl. No.: 14/601,453

(22) Filed: Jan. 21, 2015

(65) Prior Publication Data

US 2015/0211568 A1   Jul. 30, 2015

Related U.S. Application Data

(60) Provisional application No. 61/933,537, filed on Jan. 30, 2014.

(51) Int. Cl.

| | | |
|---|---|---|
| *F16B 19/00* | (2006.01) | |
| *F16B 35/04* | (2006.01) | |
| *B21J 15/02* | (2006.01) | |
| *F16B 19/10* | (2006.01) | |
| *B21J 15/04* | (2006.01) | |
| *F16B 19/05* | (2006.01) | |

(52) U.S. Cl.
CPC .............. *F16B 35/04* (2013.01); *B21J 15/022* (2013.01); *B21J 15/043* (2013.01); *F16B 19/1063* (2013.01); *F16B 19/05* (2013.01)

(58) Field of Classification Search
CPC .... F16B 19/00; F16B 19/05; F16B 19/1027; F16B 19/1063; F16B 35/04; B21J 15/02; B21J 15/022; B21J 15/043; B21J 15/10; B21J 15/36
USPC ................................................. 411/360, 361
See application file for complete search history.

(56) References Cited

U.S. PATENT DOCUMENTS

| | | |
|---|---|---|
| 2,531,048 A | 11/1950 | Huck |
| 2,531,049 A | 11/1950 | Huck |
| 2,764,045 A | 9/1956 | Koenig |
| 3,029,665 A | 4/1962 | Baugh et al. |
| 3,215,024 A | 11/1965 | Brilmyer et al. |
| 3,915,053 A | 10/1975 | Buhl |
| 4,299,519 A | 11/1981 | Corbett |
| 4,447,077 A | 5/1984 | Palmer |
| 4,472,096 A | 9/1984 | Ruhl et al. |
| 4,531,871 A | 7/1985 | Sigmund |
| 4,597,263 A | 7/1986 | Corbett |

(Continued)

OTHER PUBLICATIONS

International Search Report and Written Opinion dated Apr. 21, 2015, issued by the European Patent Office in International (PCT) Application No. PCT/US2015/012153 (9 pages).

*Primary Examiner* — Roberta Delisle
(74) *Attorney, Agent, or Firm* — Greenberg Traurig, LLP

(57) ABSTRACT

A fastening system including a fastener and a fastener installation tool. The fastener includes a pin member having an elongated shank portion with a threaded portion, a stop shoulder located at an end of the threaded portion, and a pull portion extending from the stop shoulder. The stop shoulder includes an inner annular wall extending longitudinally from the end of the threaded portion, and an inner face extending outwardly and obliquely from the shank portion. The inner annular wall and the inner face form an annular receiving area. The fastener installation tool includes a puller having a front face. The receiving area of the fastener is adapted to receive the front face of the fastener installation tool when the puller engages the pull portion of the pin member.

22 Claims, 6 Drawing Sheets

(56) References Cited

U.S. PATENT DOCUMENTS

| | | |
|---|---|---|
| 4,813,834 A | 3/1989 | Smith |
| 4,867,625 A | 9/1989 | Dixon |
| 4,878,372 A | 11/1989 | Port et al. |
| 4,921,384 A | 5/1990 | Nordyke |
| 4,943,196 A | 7/1990 | Dahl |
| 4,995,777 A | 2/1991 | Warmington |
| 5,049,016 A | 9/1991 | Nordyke |
| 5,090,852 A | 2/1992 | Dixon |
| 5,125,778 A | 6/1992 | Sadri |
| 5,315,755 A | 5/1994 | Fulbright et al. |
| 5,548,889 A | 8/1996 | Smith et al. |
| 5,604,968 A | 2/1997 | Fulbright et al. |
| 6,233,802 B1 | 5/2001 | Fulbright |
| 6,235,582 B1 | 5/2001 | Chen |
| 6,325,582 B1 | 12/2001 | Sadri et al. |
| 6,497,024 B2 | 12/2002 | Fulbright |
| 6,702,684 B2 | 3/2004 | Harbin et al. |
| 7,195,438 B2 | 3/2007 | Harbin et al. |
| 7,293,339 B2 | 11/2007 | Mercer et al. |
| 7,891,924 B2 * | 2/2011 | Mercer ............... B21J 15/022 411/361 |
| 7,921,530 B2 | 4/2011 | Mercer et al. |
| 8,621,734 B2 * | 1/2014 | Mercer ............... B21J 15/022 29/243.5 |
| 8,727,685 B2 * | 5/2014 | Corbett ............... F16B 19/05 411/360 |

* cited by examiner

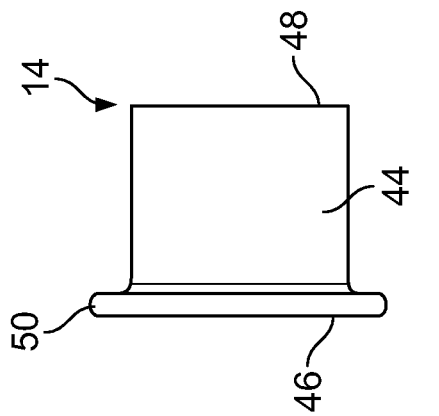
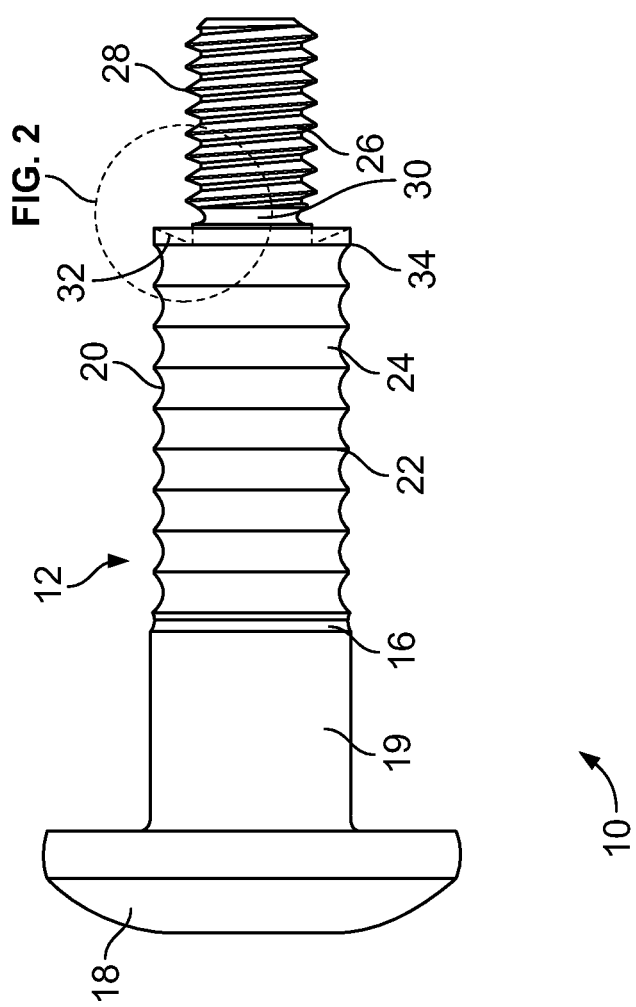
FIG. 1
FIG. 2

FASTENER AND FASTENER INSTALLATION TOOL

CROSS-REFERENCE TO RELATED APPLICATION

This application relates to and claims the benefit of commonly owned, U.S. Provisional Patent Application No. 61/933,537, filed on Jan. 30, 2014, entitled FASTENER AND FASTENER INSTALLATION TOOL, which is incorporated by reference herein in its entirety.

FIELD OF THE INVENTION

The present invention relates to a fastening system and, more particularly, to a fastening system including a swage type, lock bolt fastener and an associated fastener installation tool.

BACKGROUND OF THE INVENTION

Two-piece swage-type fasteners, commonly referred to as lock bolts, are used to secure a plurality of work pieces together. Typically, swage-type fasteners include a pin member having lock grooves and a swage collar adapted to be swaged into the lock grooves of the pin member by a fastener installation tool. The fastener installation tool includes a nose assembly having a puller that engages a pull portion of the pin member during fastener installation.

SUMMARY OF THE INVENTION

In an embodiment, a fastening system includes a fastener having a pin member including an elongated shank portion having a threaded portion, a stop shoulder located at an end of the threaded portion, and a pull portion extending from the stop shoulder, wherein the stop shoulder includes an inner annular wall extending longitudinally from the end of the threaded portion, and an inner face extending outwardly and obliquely from the shank portion, wherein the inner annular wall and the inner face form an annular receiving area; and a fastener installation tool having a puller with a front face, wherein the receiving area of the fastener is adapted to receive the front face of the fastener installation tool when the puller engages the pull portion of the pin member.

In an embodiment, the inner face of the stop shoulder of the pin member extends at a first angle measured transversely from a longitudinal axis of the pin member. In an embodiment, the front face of the puller of the fastener installation tool is angled at a second angle measured transverse to a longitudinal axis of the puller. In an embodiment, the second angle is chosen to be substantially the same as the first angle. In an embodiment, the first angle is within a range of about 110 degrees to about 170 degrees. In an embodiment, the second angle is within a range of about 110 degrees to about 170 degrees.

In an embodiment, the pull portion of the pin member includes at least one pull groove, and the puller of the fastener installation tool includes at least one tooth that is sized and shaped to engage the at least one pull groove of the pull portion of the pin member. In an embodiment, the pull portion of the pin member includes a plurality of pull grooves, and the puller of the fastener installation tool includes a plurality of teeth that is sized and shaped to engage the plurality of pull grooves of the pull portion of the pin member. In an embodiment, the inner annular wall and the inner face of the stop shoulder are joined to one another by a radiused portion.

In an embodiment, the fastening system includes a collar adapted to be swaged onto the threaded portion of the pin member. In an embodiment, the pull portion of the pin member includes a breakneck groove located intermediate the stop shoulder and the pull portion of the pin member, wherein the pull portion is adapted to break off from the shank of the pin member at the breakneck groove when a sufficient axial force is applied to the pin member.

In an embodiment, a fastener includes a pin member having an elongated shank portion having a threaded portion, a stop shoulder located at an end of the threaded portion, and a pull portion extending from the stop shoulder, wherein the stop shoulder includes an inner annular wall extending longitudinally from the end of the threaded portion, and an inner face extending outwardly and obliquely from the shank portion, wherein the inner annular wall and the inner face form an annular receiving area that is adapted to receive a front face of a puller of a fastener installation tool when the puller engages the pull portion of the pin member.

BRIEF DESCRIPTION OF THE DRAWINGS

FIG. 1 is a side elevational view of a fastener constructed in accordance with an embodiment of the present invention;

DETAILED DESCRIPTION OF THE DRAWINGS

Figure 3:
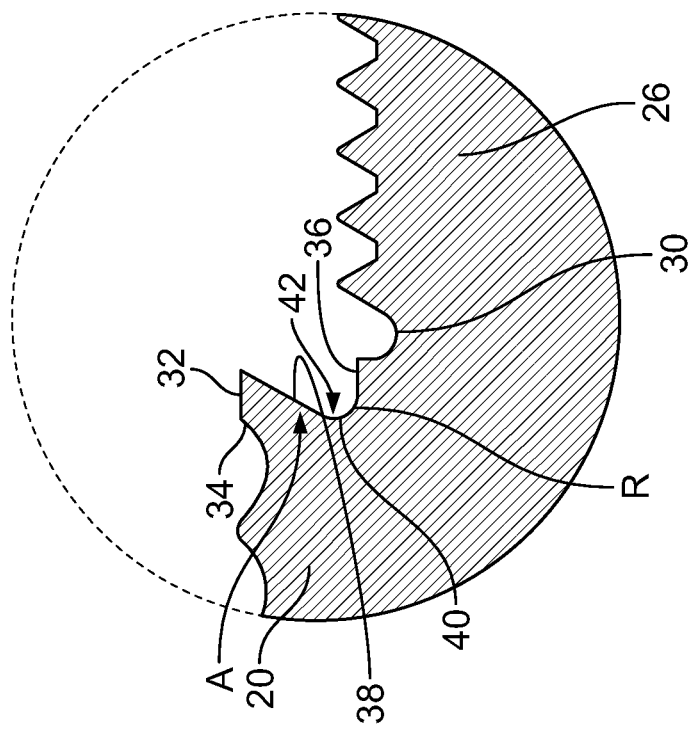
FIG. 3 is a cross-sectional view of FIG. 2.

Referring to FIG. 1, in an embodiment, a fastener 10 including a pin member 12 and a swage collar 14 that is sized and shaped to mate with and be swaged onto the pin member 12. In an embodiment, the pin member 12 is a lock bolt. In an embodiment, the pin member 12 includes an elongated shank portion 16 which terminates at one end in a head 18. In an embodiment, the shank portion 16 includes a smooth cylindrical portion 19, a threaded portion 20 having a plurality of threads 22 with lock grooves 24, and a pull portion 26 having a plurality of pull grooves 28. In an embodiment, the pull grooves 28 are helical grooves. In an embodiment, the pull portion 26 includes at least one pull groove 28. In another embodiment, the pull portion includes a single pull groove 28. In an embodiment, the pull portion 26 includes an annular breakneck groove 30 located intermediate the threaded portion 20 and the pull portion 26. In an embodiment, the breakneck groove 30 defines the weakest point of the pin member 12 and is adapted to fracture in response to the axial force applied to the pin member 12, particularly an axial force applied to the pull portion 26.

Figure 2:
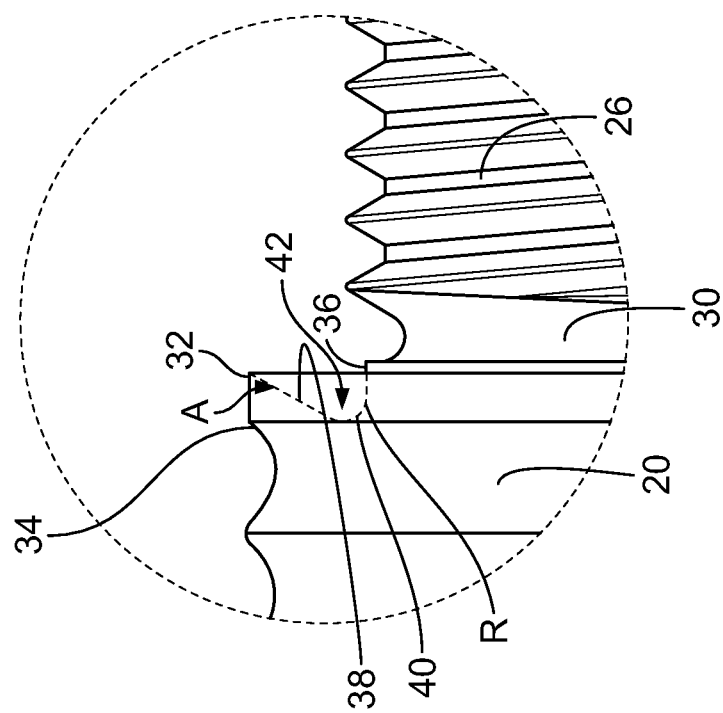
FIG. 2 is an enlarged view of the highlighted circular area shown in FIG. 1.

Referring to FIGS. 1 through 3, in an embodiment, the shank portion 16 of the pin member 12 includes a stop shoulder 32 located at an end 34 of the threaded portion 20 and proximate to the breakneck groove 30 of the pull portion 26. In an embodiment, the stop shoulder 32 is formed annularly on the shank portion 16. In an embodiment, the stop shoulder 32 includes an inner annular wall 36 and an inner face 38 extending outwardly from the shank portion 16. In an embodiment, the annular wall 36 and the inner face 38 are joined by a radiused portion 40 formed intermediate thereof. In an embodiment, the inner wall 36, the inner face 38, and the radiused portion 40 form an annular receiving area 42. In an embodiment, the inner annular wall 36 extends longitudinally from the end 34 of the threaded portion 20. In an embodiment, the inner face 38 of the stop shoulder 32 extends obliquely at an included angle A measured transversely from the longitudinal axis of the pin member 12. In an embodiment, the included angle A is about 120 degrees. In another embodiment, the included angle A is about 110 degrees. In another embodiment, the included angle A is about 100 degrees. In another embodiment, the included angle A is about 130 degrees. In another embodiment, the included angle A is about 140 degrees. In another embodiment, the included angle A is about 150 degrees. In another embodiment, the included angle A is about 160 degrees. In another embodiment, the included angle A is about 170 degrees. In another embodiment, the included angle A is within a range of about 110 degrees to about 170 degrees. In an embodiment, the radiused portion 40 includes a radius of curvature R. In an embodiment, the stop shoulder 32 consists of other shapes and sizes, and can consist of an overhanging lip or curl.

In an embodiment, the pin member 12 is made from medium carbon alloy steel. In an embodiment, the pin member 12 is a Grade 8 strength level bolt. In other embodiments, the pin member 12 can be characterized by any grade known in the art, such as, for example, Grade 2, Grade 5, Grade 8, Class 8.8, and Class 10.9. In other embodiments, the pin member 12 may be made from other suitable materials known in the art.

Referring back to FIG. 1, in an embodiment, the swage collar 14 includes a tubular-shaped shank 44 having a first end 46 and a second end 48 opposite the first end 46, a flange 50 extending circumferentially from and at the first end 46, and a through bore extending from the first end 46 to the second end 48 (not shown in the Figures). In an embodiment, the shank 44 includes a generally uniform, cylindrical configuration. In other embodiments, the swage collar 14 can comprise features of any of the collars as disclosed and described in U.S. Pat. No. 7,293,339 to Mercer et al., which is incorporated by reference herein in its entirety.

In an embodiment, the swage collar 14 includes an internal fit-up tab extending from an inner surface of the collar 14 (not shown in the Figures). In an embodiment, the fit-up tab includes a single thread, such as that shown in U.S. Pat. No. 4,867,625 to Dixon, which is incorporated by reference herein in its entirety. In an embodiment, the fit-up tab is positioned proximate to the second end 48 of the shank 44 of the swage collar 14. In another embodiment, the fit-up tab is positioned proximate to the first end 46 of the shank 44 of the swage collar 14. The purpose and function of the fit-up tab shall be described below. In another embodiment, the swage collar 14 need not include the fit-up tab.

In an embodiment, the swage collar 14 is made of low carbon steel. In another embodiment, the swage collar 14 is made from unannealed low carbon steel. In another embodiment, the swage collar 14 is made from annealed low carbon steel. In another embodiment, the swage collar 14 is "as-headed" and does not require thermal processing, as disclosed and described in aforesaid U.S. Pat. No. 7,293,339 to Mercer et al., which is incorporated by reference herein in its entirety. As employed herein, the term "as-headed" refers to a collar which is strain hardened, for example, from cold working, rather than changing hardness using a thermal process (e.g., quench and tempering; stress relieving; etc.).

Figure 4:
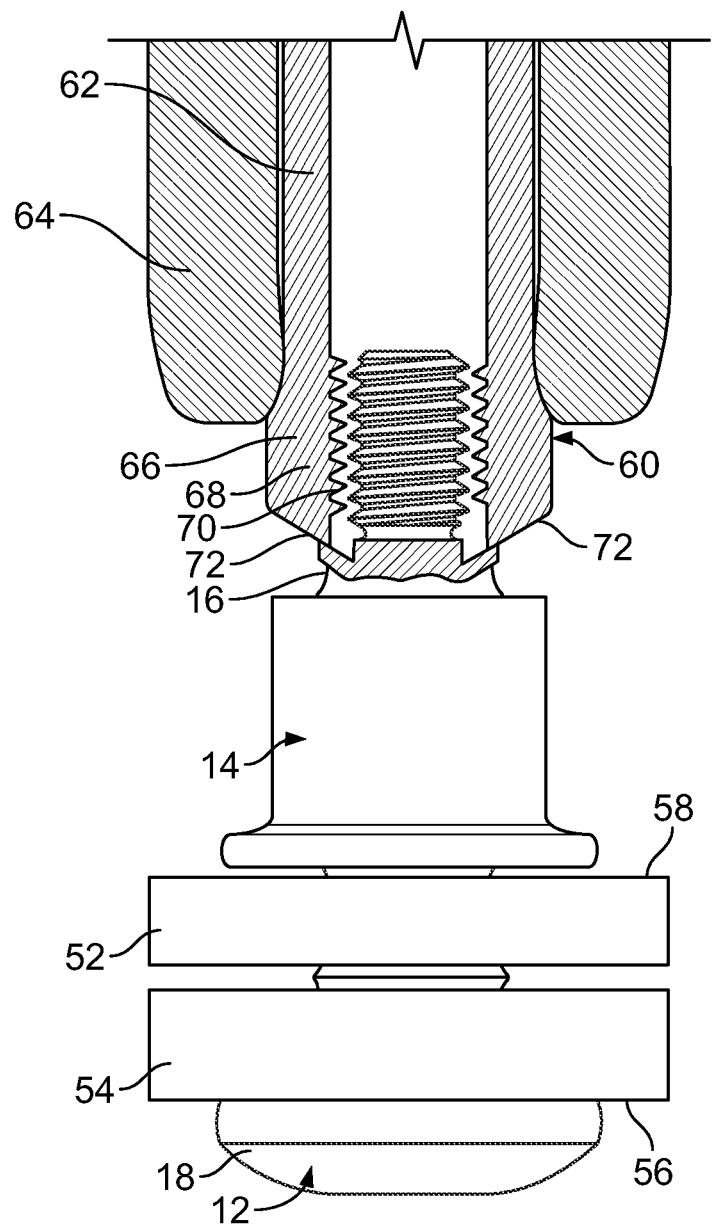
FIGS. 4 through 7 are sequential views of the installation of the fastener illustrated in FIG. 1 by a fastener installation tool.

Referring to FIG. 4, in an embodiment, the fastener 10 is adapted to secure a plurality of work pieces 52, 54 together. In an embodiment, the shank portion 16 of the pin member 12 is inserted through holes of the work pieces 52, 54, with the head 18 abutting one side 56 of the work piece 54 and the shank portion 16 extending outwardly from one side 58 of the work piece 52. In an embodiment, the swage collar 14 is fitted on the shank portion 16 of the pin member 12, whereby the shank portion 16 is inserted within the through bore of the collar 14. In an embodiment, the fit-up tab threadedly engages the threads 22 of the pin member 12 to initially retain the collar 14 on the pin member 12. In an embodiment, the swage collar 14 is fitted on the pin member 12 until the flange 50 of the collar 14 abuts the side 58 of the work piece 52.

Referring to FIG. 4, in an embodiment, a fastener installation tool 60 includes a puller 62 and a swage anvil 64. In an embodiment, the puller 62 includes chuck jaws 66 having internal teeth 68 and pull grooves 70 that are sized, shaped and adapted to grip the pull grooves 28 of the pull portion 26 of the pin member 12. In an embodiment, the pull grooves 70 of the puller 62 are helical grooves. In an embodiment, the puller 62 includes at least one pull groove 70. In another embodiment, the puller 62 includes a single pull groove 70. In another embodiment, the pull grooves 70 of the puller 62 are formed by tapping. In an embodiment, the chuck jaws 66 of the puller include a front face 72. In an embodiment, the front face is angled at an angle B measured transverse to the longitudinal axis of the puller 62. In an embodiment, the angle B is chosen to match or be substantially the same as the angle A of the inner face 38 of the stop shoulder 32 of the pin member 12. In an embodiment, the angle B is about 120 degrees. In another embodiment, the angle B is about 110 degrees. In another embodiment, the angle B is about 100 degrees. In another embodiment, the angle B is about 130 degrees. In another embodiment, the angle B is about 140 degrees. In another embodiment, the angle B is about 150 degrees. In another embodiment, the angle B is about 160 degrees. In another embodiment, the angle B is about 170 degrees. In another embodiment, the angle B is within a range of about 110 degrees to about 170 degrees.

In an embodiment, the fastener installation tool may comprise features of the tools disclosed and described in aforesaid U.S. Pat. No. 7,293,339 to Mercer et al. In an embodiment, the swage anvil of the tool is adapted to engage the swage collar 14 and apply a relative axial force between the swage collar 14 and the pin member 12, and to move over the swage collar 14 and swage it into the lock grooves 24 of the pin member 12.

Figure 5A:
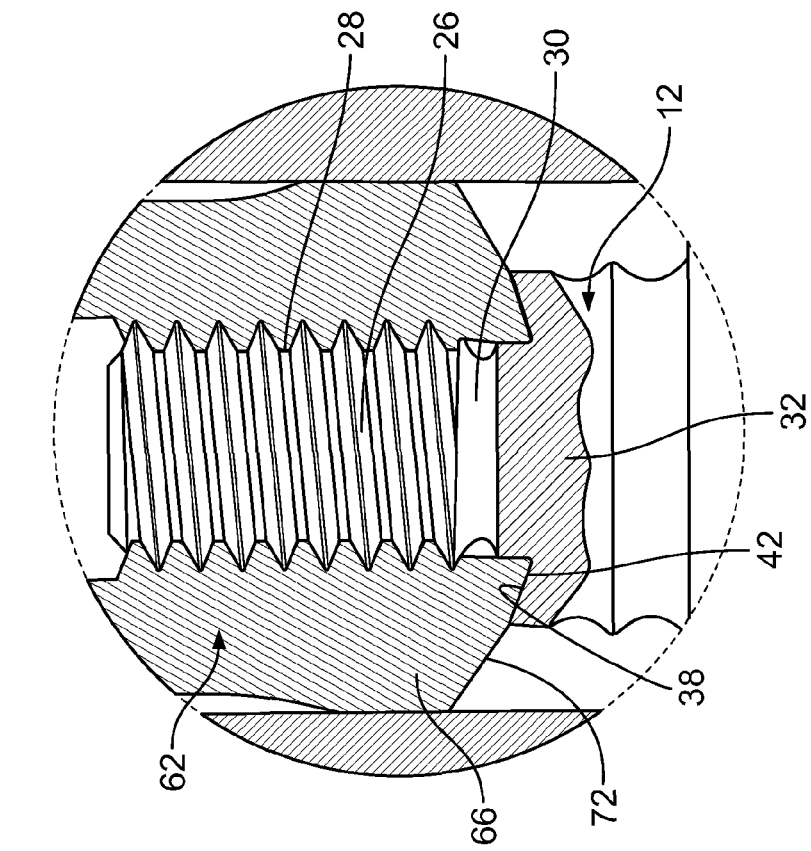
Figure 5:
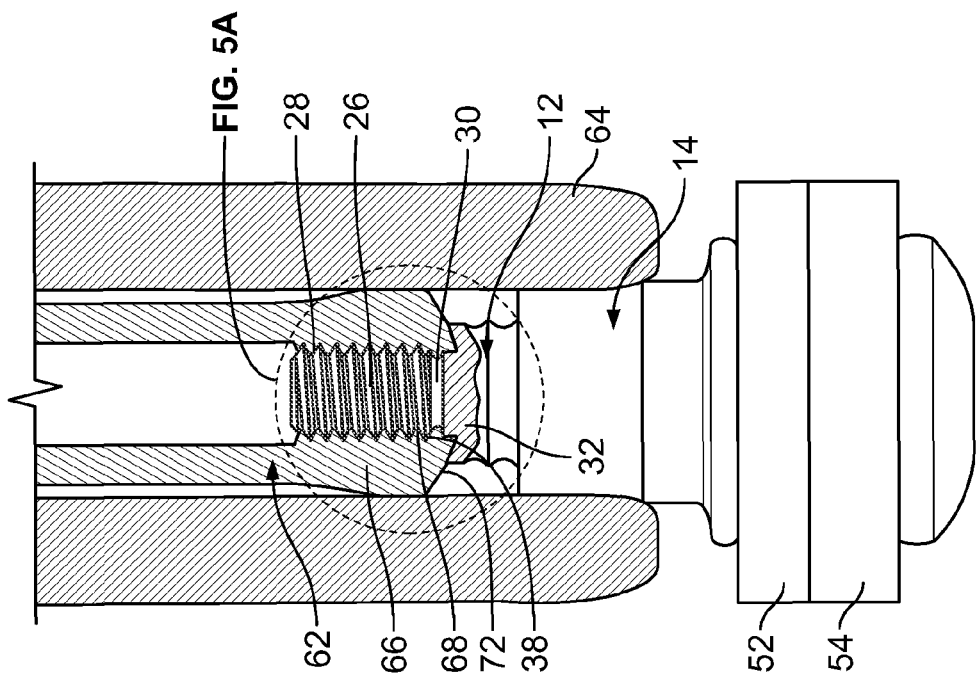

Referring to FIG. 4, in an embodiment, the fastener 10 is attached to the work pieces 52, 54 as described above. In an embodiment, the jaws 66 of the puller 62 are split and spread to an open position in order to clear and slip over the pull portion 26 of the pin member 12. Referring to FIGS. 5 and 5A, in an embodiment, the teeth 68 and pull grooves 70 of the puller 62 engage the pull grooves 28 of the pull portion 26 of the pin member 12. In an embodiment, the face 72 of the jaws 66 of the puller 62 stops against the inner face 38 of the stop shoulder 32 of the pin member 12 to align the puller 62 properly with the pull portion 26 of the pin member 12. Along these lines, the stop shoulder 32 permits the puller 62 to shift forward as it engages the pull portion 26 of the pin member 12 and align the teeth 68 of the puller 62 with the pull grooves 28 of the pull portion 26 of the pin member 12. Depending upon the rotational orientation of the pin member 12 relative to the puller 62, the puller 62 will shift either forward into the receiving area 42 of the stop shoulder 32 of the pin member 12 or backward away from the stop shoulder 32 as the teeth 68 of the puller 62 are closed in on the pull grooves 28 of the pin member 12. If the puller 62 shifts forward, the included angle A of the stop shoulder 32 prevents interference between the puller 62 and the stop shoulder 32. The puller 62 can then slide downward and inward towards the face 38 as the puller 62 is driven forward when engaging the pull portion 26. Once the puller 62 is aligned with the pull portion 26, the jaws of the puller 62 are then move inwardly to a closed position and clamp down on the pull portion 26 and provide an axial force on the pin member 12 and close any gap between the work pieces 52, 54. The anvil 64 then engages and swages the swage collar 14.

Figure 6:
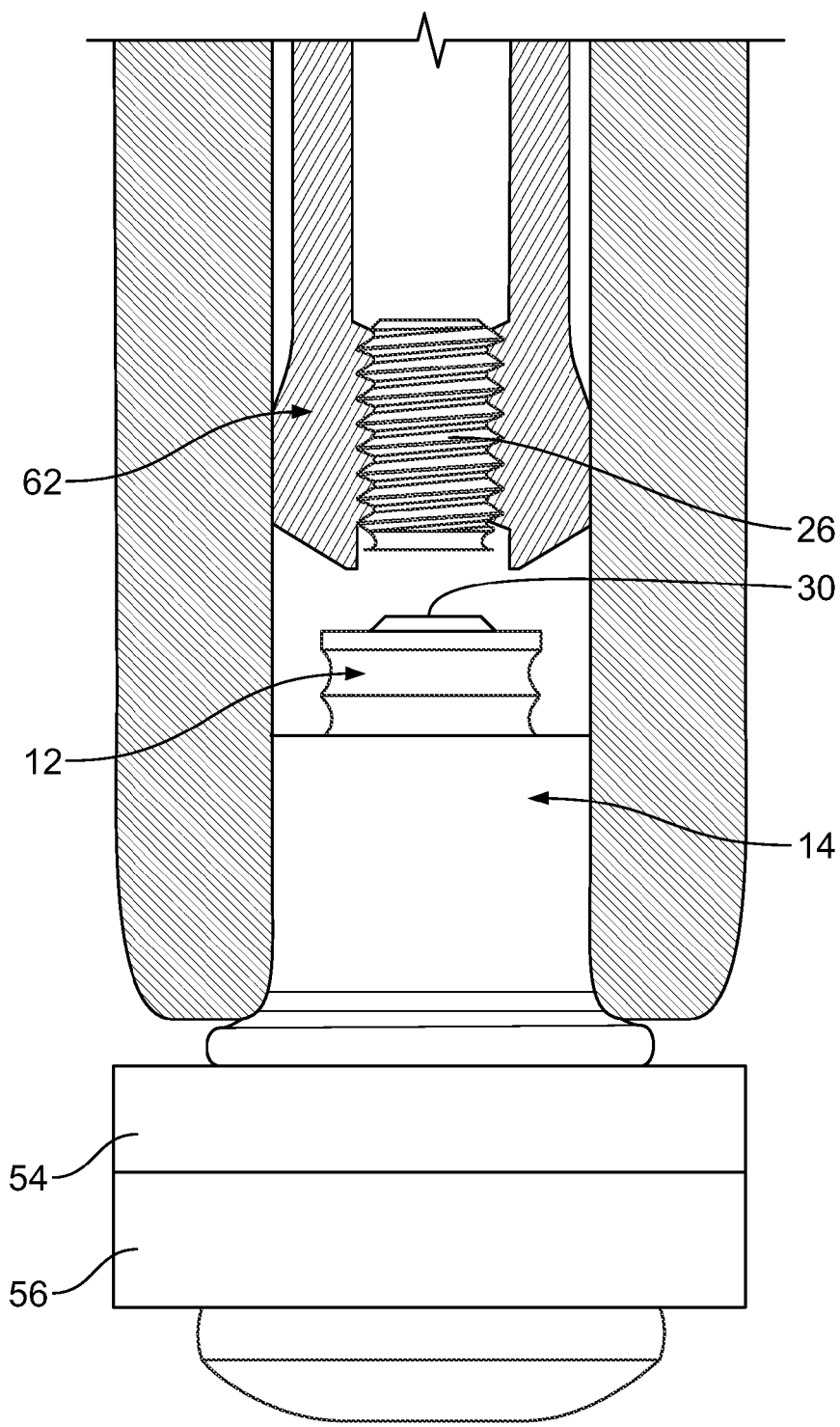
Figure 7:
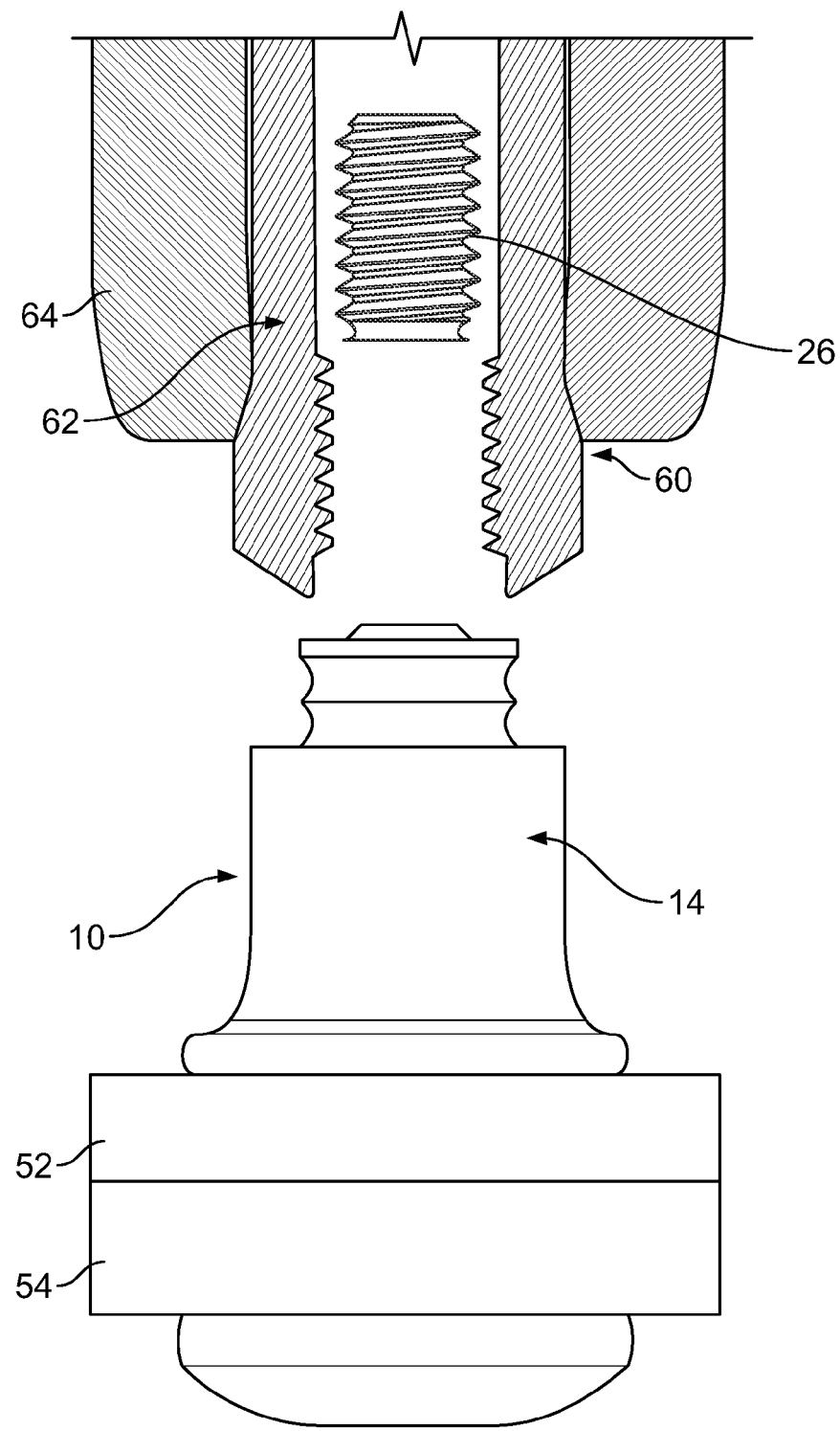

Referring to FIG. 6, when the collar 14 is fully swaged, the puller 62 continues to provide an axial force on the pin member 12 until the pull portion 26 snaps off at the breakneck groove 30, thereby eliminating the excess protrusion. Referring to FIG. 7, the puller 62 returns back and the anvil 64 disengages the swage collar 14. The pull portion 26 ejects from the tool 60 into a collection device. With the pull portion 26 broken off of the installed fastener 10, there exists a visual indication that the tool 60 was applied to the fastener 10.

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. A fastening system, comprising:
   a fastener having a pin member including an elongated shank portion having a threaded portion, a stop shoulder located at an end of the threaded portion, and a pull portion extended from the stop shoulder, wherein the stop shoulder includes an inner annular wall extending longitudinally from the end of the threaded portion, and an inner face extending outwardly and obliquely from the shank portion, wherein the inner annular wall and the inner face form an annular receiving area; and
   a fastener installation tool having a puller with a front face, wherein the receiving area of the fastener receives the front face of the fastener installation tool when the puller engages the pull portion of the pin member.

2. The fastening system of claim 1, wherein the inner face of the stop shoulder of the pin member extends at a first angle measured transversely from a longitudinal axis of the pin member.

3. The fastening system of claim 2, wherein the front face of the puller of the fastener installation tool is angled at a second angle measured transverse to a longitudinal axis of the puller.

4. The fastening system of claim 3, wherein the second angle is chosen to be substantially the same as the first angle.

5. The fastening system of claim 4, wherein the first angle is within a range of about 110 degrees to about 170 degrees.

6. The fastening system of claim 5, wherein the second angle is within a range of about 110 degrees to about 170 degrees.

7. The fastening system of claim 4, wherein the pull portion of the pin member includes at least one pull groove, and the puller of the fastener installation tool includes at least one tooth that is sized and shaped to engage the at least one pull groove of the pull portion of the pin member.

8. The fastening system of claim 7, wherein the pull portion of the pin member includes a plurality of pull grooves, and the puller of the fastener installation tool includes a plurality of teeth that is sized and shaped to engage the plurality of pull grooves of the pull portion of the pin member.

9. The fastening system of claim 4, wherein the inner annular wall and the inner face of the stop shoulder are joined to one another by a radiused portion.

10. The fastening system of claim 4, further comprising a collar adapted to be swaged onto the threaded portion of the pin member.

11. The fastening system of claim 4, wherein the pull portion of the pin member includes a breakneck groove located intermediate the stop shoulder and the pull portion of the pin member, wherein the pull portion is adapted to break off from the shank of the pin member at the breakneck groove when a sufficient axial force is applied to the pin member.

12. A fastener, comprising:
    a pin member including an elongated shank portion having a threaded portion, a stop shoulder located at an end of the threaded portion, and a pull portion extending from the stop shoulder, wherein the stop shoulder includes an inner annular wall extending longitudinally from the end of the threaded portion, and an inner face extending outwardly and obliquely from the shank portion,
    wherein the inner annular wall and the inner face form an annular receiving area that receives a front face of a puller of a fastener installation tool when the puller engages the pull portion of the pin member.

13. The fastener of claim 12, wherein the inner face of the stop shoulder of the pin member extends at a first angle measured transversely from a longitudinal axis of the pin member.

14. The fastener of claim 13, wherein the front face of the puller of the fastener installation tool is angled at a second angle measured transverse to a longitudinal axis of the puller.

15. The fastener of claim 14, wherein the second angle is chosen to be substantially the same as the first angle.

16. The fastener of claim 15, wherein the first angle is within a range of about 110 degrees to about 170 degrees.

17. The fastener of claim 16, wherein the second angle is within a range of about 110 degrees to about 170 degrees.

18. The fastener of claim 15, wherein the pull portion of the pin member includes at least one pull groove, and the puller of the fastener installation tool includes at least one tooth that is sized and shaped to engage the at least one pull groove of the pull portion of the pin member.

19. The fastener of claim 18, wherein the pull portion of the pin member includes a plurality of pull grooves, and the puller of the fastener installation tool includes a plurality of teeth that is sized and shaped to engage the plurality of pull grooves of the pull portion of the pin member.

20. The fastener of claim 15, wherein the inner annular wall and the inner face of the stop shoulder are joined to one another by a radiused portion.

21. The fastener of claim 15, further comprising a collar adapted to be swaged onto the threaded portion of the pin member.

22. The fastener of claim 15, wherein the pull portion of the pin member includes a breakneck groove located intermediate the stop shoulder and the pull portion of the pin member, wherein the pull portion is adapted to break off from the shank of the pin member at the breakneck groove when a sufficient axial force is applied to the pin member.

* * * * *

UNITED STATES PATENT AND TRADEMARK OFFICE
CERTIFICATE OF CORRECTION

PATENT NO. : 9,488,213 B2
APPLICATION NO. : 14/601453
DATED : November 8, 2016
INVENTOR(S) : Robert J. Corbett It is certified that error appears in the above-identified patent and that said Letters Patent is hereby corrected as shown below:

In the Specification

Column 1, Line 8, delete "commonly owned," and insert --commonly owned, co-pending--.

Column 5, Line 9, delete "move" and insert --moved--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*